United States Patent Office 3,843,351
Patented Oct. 22, 1974

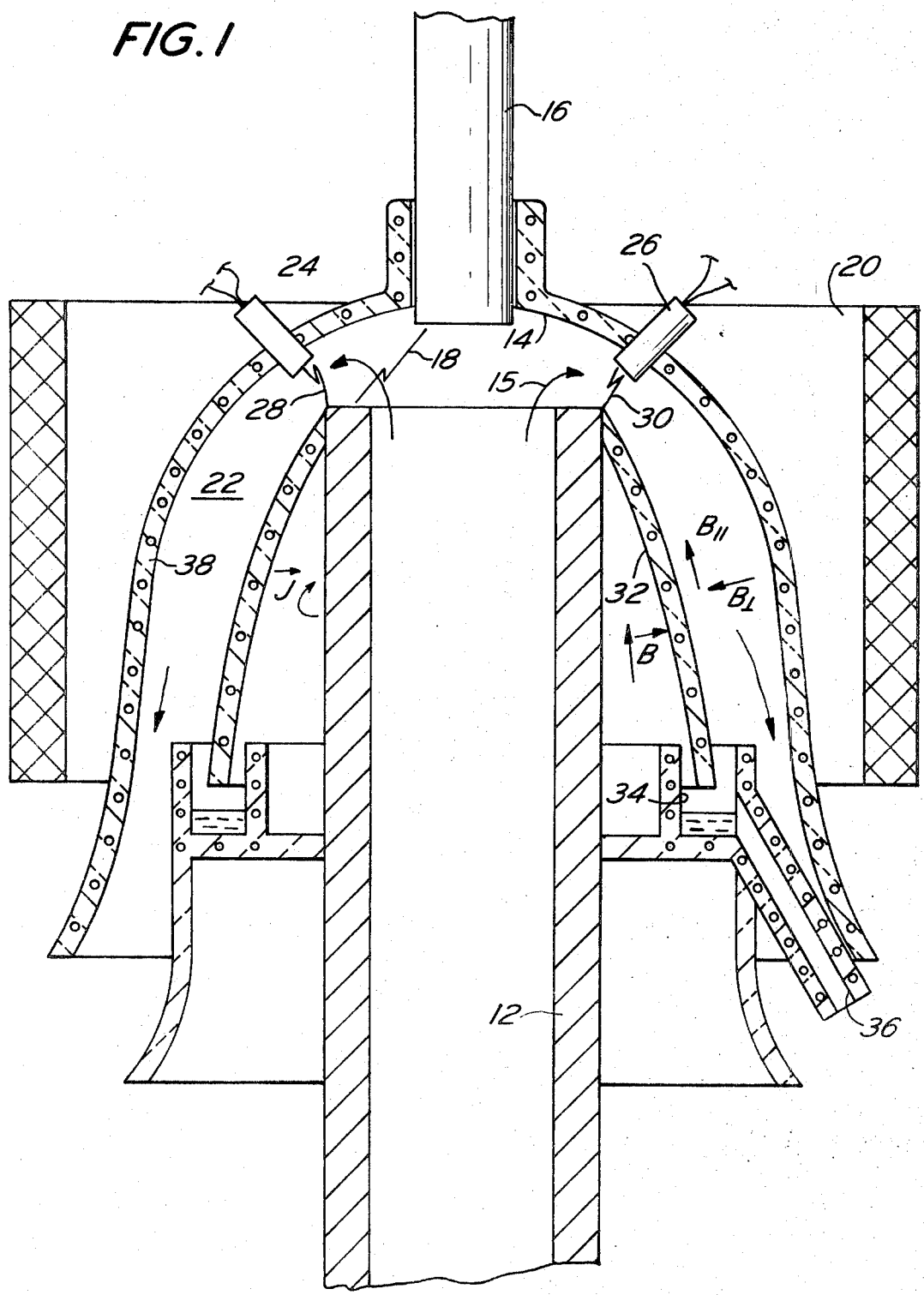

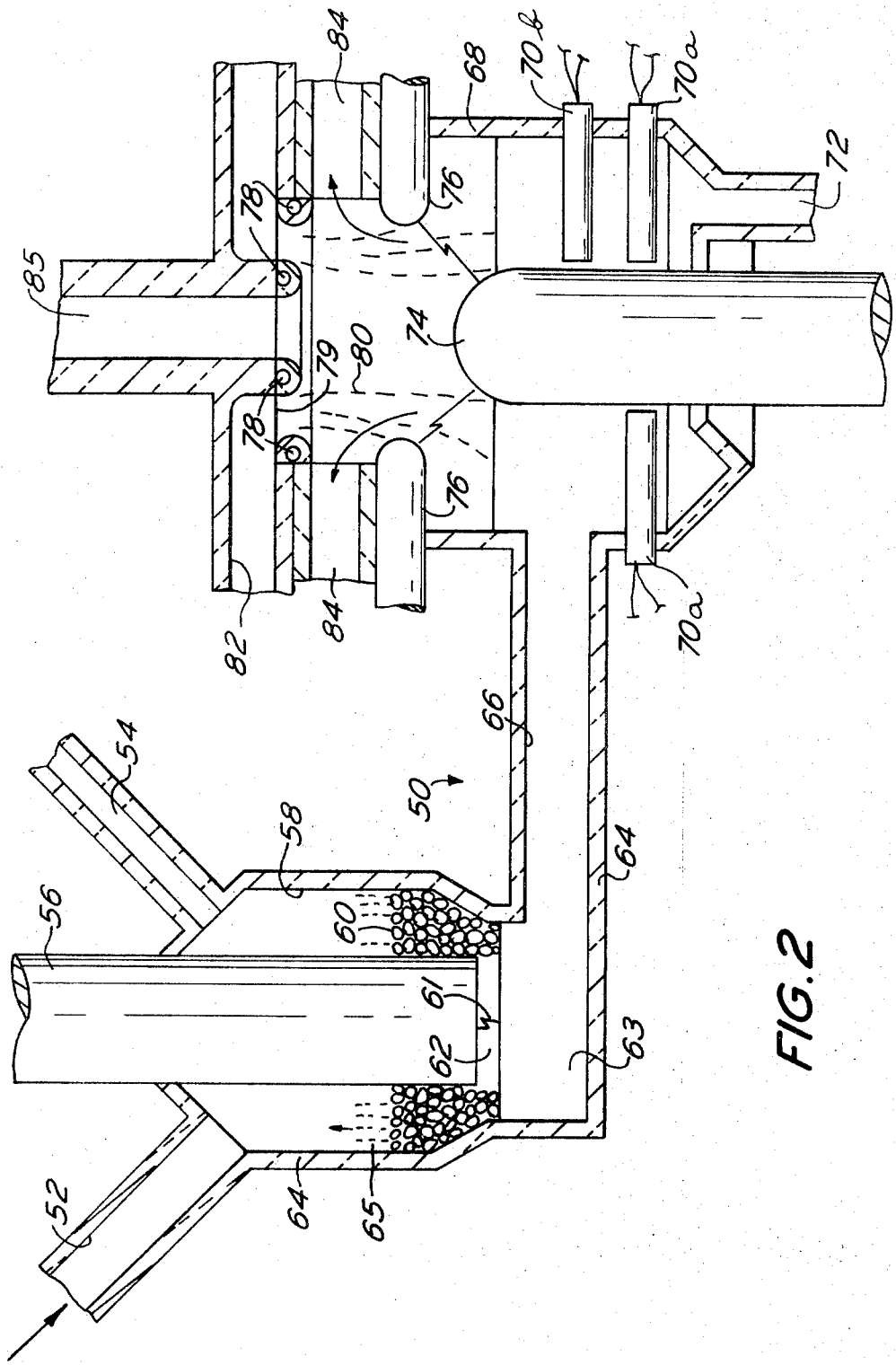

3,843,351
METHOD AND APPARATUS FOR SEPARATING A CONSTITUENT OF A COMPOUND, SUCH AS A METAL FROM AN ORE, BY CHEMICAL REACTION AND PHYSICAL SEPARATION USING A PLASMA IN THE PRESENCE OF A MAGNETIC FIELD
Alan W. Smith and Donald J. Nelson, Seattle, Wash., assignors to The Boeing Company, Seattle, Wash.
Filed May 24, 1973, Ser. No. 363,763
Int. Cl. B01k 1/00; B03c 1/00; C22d 7/00
U.S. Cl. 75—10 R       19 Claims

ABSTRACT OF THE DISCLOSURE

The physical separation of a constituent from a compound by partly ionizing the constituent and passing the plasma through a magnetic field is enhanced by first chemically reacting the compound to produce the constituent and a product of the reaction. This reduces containment temperature in the plasma separator. The efficiency of the plasma separator is increased by prior removal of portions of the un-ionized product and/or by distillation.

This invention relates to a plasma method and apparatus for separating constituents of a compound, and more particularly for separating a metal from its ore.

In patent application Ser. No. 269,634 filed July 7, 1972, there is described in detail a method and apparatus for dissociating matter into constituent elements and separating the elements from each other. In particular, that invention relates to a method and apparatus for dissociating compounds, such as metal oxides, to constituent elements and separating a desired element (e.g., aluminum from oxygen) using high temperature plasmas. Such machines operate at relatively reduced temperatures by reason of the fact that the desired species is only partially ionized and the other species is substantially un-ionized. Just the same, it is necessary to evaporate the compound and to direct the vapor into the desired flow path. This requires walls that can withstand both the necessarily high temperatures and the action of the compound in the condensed and vapor state.

The present invention provides a solution to the high temperature problems of the method and apparatus described in application Ser. No. 269,634. In doing so, it also benefits the method and apparatus described in application Ser. No. 269,634 by providing a method and apparatus for partial separation of species or constituents of the compound before the vapor passes into the plasma separator. In particular, the present invention provides a method and apparatus whereby metal ores can be reacted with other substances to produce compounds or mixtures which may be vaporized at substantially lower temperatures than necessary for the ore or compound itself and which may contain substances which have sufficiently greater or sufficiently lower vapor pressures than the desired element so that a partial separation by evaporation can be achieved. At the same time, the present invention uses the plasma separation process described in application Ser. No. 269,634 with all of its advantages.

A most useful reaction is that between a metal oxide and carbon. The products of this reaction can be a metal, e.g., aluminum or magnesium, and carbon monoxide. This reaction is useful when the metal plus carbon monoxide evaporates at a significantly lower temperature than that of the metal oxide.

There are several methods employed for the extraction of metals from their ores, in a more or less pure condition. They may be summarized as follows:

(1) Reduction of the oxide with hydrogen (e.g., tungsten).
(2) Reduction of the oxide with carbon or carbon monoxide (e.g., iron, zinc, and tin).
(3) Reduction of the oxide with aluminum (thermite process, e.g., chromium, manganese).
(4) Oxidation (autoreduction) of the sulfide (e.g., copper, lead, mercury).
(5) Reduction of the sulfide with iron (e.g., antimony).
(6) Electrolytic processes (e.g., sodium, magnesium, calcium, aluminum).
(7) Special methods (e.g., cyanide extraction of silver, carbon monoxide from nickel).

The choice of process in any particular instance depends upon the chemical nature of the ore and the properties of the metal concerned. Some metals, such as iron, are readily reduced by the application of heat in the presence of carbon, a classical oxidation reduction process. Aluminum and certain other metals, unfortunately, are not so readily reduced. Hence the Hall process is the classical method of producing aluminum. According to the process, a solution of alumina in a molten mixture of cryolite and other fusable fluoride is used as an electrolyte, and when electrolysed, aluminum collects at the cathode. Aluminum is not, however, readily produced by reducing alumina ($Al_2O_3$) with carbon or some other reducing agent. Heating alumina and carbon to a very high temperature produces substantial amounts of aluminum carbide ($Al_4C_3$). Thus, any attempt to reduce alumina by the use of carbon necessarily means that there must be some means to separate the aluminum from the aluminum carbide in order to obtain pure aluminum. Such a process is disadvantageous from an economic point of view.

Just the same, there are advantages to reducing aluminum and certain other ones such as magnesium oxide by chemical reduction processes. Among these would be avoiding the use of large amounts of electrical power as required by the Hall process. Another would be increased throughput rates. These advantages can be realized if pure aluminum or magnesium can be separated from the products of the reduction.

At very high temperatures, carbon can be reacted with alumina to produce aluminum and carbon monoxide in a gaseous state. Aluminum carbides are produced only if the carbon is reacted with the alumina at lower temperatures. Given the foregoing, it becomes possible to produce pure aluminum if the gaseous aluminum can be separated from the gaseous carbon monoxide. The same applies to other high temperature reduction reactions which result in a gaseous vapor of the metal and the products of reduction or can be converted to such a gaseous state such as reducing dolomite [$CaMg(CO_3)_2$] to produce magnesium.

As used herein, reduction can be defined in terms of ionic theory to be a chemical reaction in which the negative valence number of some element is increased, or the positive valence number is decreased.

In patent application Ser. No. 269,634, there is described in detail a method and apparatus whereby metal among other elements can be separated from the other elements which make up an ore of the metal. The process uses partial ionization of the metal. Although the temperatures in such a process are significantly reduced by using patrial ionization, the fact remains that the system operates at dissociation and plasma temperatures of approximately 4000° K. to 5000° K. Aluminum oxide has a boiling point of 4000° K. Although this may be reduced some at lower than atmospheric pressures, the walls must operate at 3000° K. to 4000° K. Patent application Ser. No. 269,634 makes it clear that the process described therein is not limited to any particular type of chemical compound. Indeed, it is quite applicable to any chemical compound consisting of elements having sufficiently high ionization potentials that they do not ionize appreciably at the temperatures where significant ionization of another constituent element in the chemical compound takes place. Stated otherwise, the process of the aforesaid patent application operates upon a gas where only one of the dissociated elements of the compound is significantly ionized. Moreover, that element is only partially ionized. Such partially ionized element is separated from the remaining elements. Given the general applicability of the process, it can therefore be used to separate a metal from the products of the chemical reaction. The advantage of applying the process of patent application Ser. No. 269,634 to separate the metal from other products of the reaction is that the walls of the system operate at lower temperatures, such as 1800° K. to 2400° K. At such lower temperatures, the problem of designing walls to withstand extremely high temperatures is avoided.

Thus, the present invention combines the advantages of chemical reaction of metal ores, with the advantages of the separating process described in patent application Ser. No. 269,634. Moreover, the use of a chemical process is advantageous to the operation of said separating process by reason of the fact that it operates at lower temperatures.

The present invention is described in relation to the reduction of aluminum with carbon. It should be understood, however, that this is by way of example only. The reduction of other metal ores may be accomplished in accordance with the present invention. As another example, titanium dioxide has a boiling point at 2800° K. to 3300° K. while the metal produced by reduction boils above 3500° K. Adding chlorine to the reaction gives $TiCl_4$ by, $$TiO_2 + 2C + 2Cl_2 = TiCl_4 + 2CO.$$

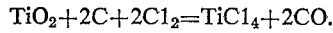

$TiCl_4$ boils at only 410° K. and hence it is extremely easy to vaporize and thereafter separate the titanium from the chlorine.

The present invention provides a further advantage in that in the course of the process a prior partial separation may be achieved by means of vapor pressure differences. As a result, the load on the plasma separator is decreased resulting in lower power requirements, higher throughputs and greater purity of the product. For example, carbon can be reacted with alumina at about 2300° K. The evolved gases may be passed through the incoming charge where all vapors except carbon monoxide are condensed. Although it is not possible to removal all the carbon and oxygen this way, up to 90% of the total carbon monoxide is evolved. The rest of the carbon and oxygen is combined or dissolved in the melt. The melt is then led to an evaporator and a plasma separator where the remaining carbon monoxide is removed.

Substances with lower vapor pressures may also be partially removed. For example, the incoming charge may consist of a clay with about equal amounts of aluminum and silicon. Silicon has an ionization potential of 8.15 electron volts and may be removed from the aluminum in the separator. However, silicon also has a much lower vapor pressure, about 1/100 of that of aluminum at 2300° K. Thus in the evaporator aluminum is preferentially evaporated. The resulting liquid becomes considerably richer in silicon. At 2300° K. the liquid may be allowed to become 90° silicon while the equilibrium vapor is only 10% silicon if the total pressure is 0.01 atmospheres. By draining off the amount of liquid necessary to maintain the desired composition, most of the silicon will be removed with only a small loss of aluminum. The evaporated aluminum can then be separated from the remaining silicon vapor in the plasma separator.

Attempts to separate aluminum from silicon by distillation alone have not proved competitive since several steps are required and evaporation at a high rate gives more vaporization of the silicon than at a low rate. In the present invention, use is made of the fact that since evaporation is required for the plasma separator, it is possible to get some additional separation by means of the aforesaid partial distillation. The amounts of components, e.g., carbon monoxide and silicon, that are removed before the vapor is heated up for the plasma separator give a savings in power, allow the plasma separator to be run at higher throughput and produce a pure product.

It is known that compounds will dissociate into their constituent elements at high temperatures. It is also known that sufficiently high temperatures will cause such elements to ionize. The existence of ionization provides a means whereby it is possible to separate the constituent elements, one from the other, using electrical, magnetic or mechanical (e.g., mass difference) processes, or a combination of them. In patent application Ser. No. 269,634, a magnetic field in combination with the partial ionization of one of the elements is used to accomplish separation in an economically practical manner.

The degree of ionization at a particular temperature varies from element to element. For example, the ionization potential of aluminum is about 5.98 ev. and that of oxygen about 13.6 ev. The ionization potential of carbon is 11.26 ev. The practical effect of differing ionization potential and other factors (e.g., degeneracy of the lowest ionized state) is that certain elements of high ionization potential do not ionize appreciably at the temperatures where significant ionization of other elements takes place. Examination of the equilibrium composition of a gas mixture at elevated temperatures demonstrates that, for certain compounds, after dissociation, one element is partially ionized but the other element or elements are not significantly ionized. The degree of ionization is a monotonically increasing function of temperature. The invention described in patent application Ser. No. 269,634 provides a process and apparatus which operates upon a gas containing only one significantly ionized species. Separation using only partial ionization means that lower temperatures can be used. Lower temperatures mean less energy input. Analysis shows that throughput rates of production for the selected species are little effected by using low percentages of ionization. This means that the process is operated at very small percentages of ionization (1-2%) and therefore significantly lower enthalpy relative to those processes which require full ionization. At the same time, the process produces greater quantities of the selected species. This is made practical by the very rapid (resonant) exchange of charge between atoms and ions of a single specie.

The invented process separates the partly ionized specie from the essentially un-ionized species using a magnetic field. It has been found that a magnetic field at an angle to the direction of flow of the partly ionized gas generates a separating force that operates well at plasma pressures so high that fluid flow rather than molecular flow exists. This, together with the large flow velocities permitted by the process produces large throughput rates.

The separator of application Ser. No. 269,634 uses an externally generated magnetic field through which the entire plasma including the ions, the electrons and the neutral elements are allowed to flow. More particularly, a magnetic field is oriented at an angle such that it has both perpendicular and parallel components relative to the plasma flow velocity. The interaction of the perpendicular component with the plasma flow velocity produces a current density having both magnitude and direction. The interaction of the current density and the parallel magnetic field component produces a separating force upon the ions and the neutral elements of the same specie that is perpendicular to the plasma velocity. To prevent a destructive space charge from building up, the current is allowed to close upon itself. This is accomplished by providing a structure having axial symmetry. The net result is a separating force on the entirety of the partly ionized specie.

Having created a separating force that is acted only upon one of the constituent elements, it is possible to isolate that element from the remaining neutral elements. The specie upon which the electromagnetic separation force acts will undergo forced diffusion through the other species and so be concentrated relative to the others in one region of space. A scoop or cold wall for condensation located in this region completes the separation process. In the latter instance, for example, the ions and neutral elements of the same specie are permitted to strike a relatively cool surface and hence pass from the gases to the molten state.

The foregoing process does not require that all of the elements be dissociated, one from the other. It works just as well if a selected specie to be partly ionized is merely dissociated from another compound. For example, the reduction of aluminum with carbon produces aluminum and carbon monoxide. Greatly simplified, the equation (reversible) is:

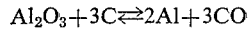
$$Al_2O_3 + 3C \rightleftharpoons 2Al + 3CO$$

Carbon monoxide is a very stable molecule at high temperatures and does not dissociate easily. Hence, the process can be operated at a temperature giving 1–2% ionization of aluminum without getting a reaction between the aluminum and the carbon monoxide. High temperatures favor the aforesaid reaction toward the right and low temperatures favor the reaction toward the left plus the formation of carbides such as $Al_4C_3$ or oxycarbides such as $Al_4O_4C$. Thus the reaction best takes place at a high temperature. But more importantly, the reaction takes place at a temperature well below the temperatures which would be required to fully dissociate all of the elements, each from the other. All that is important for the process to take place is that the aluminum be dissociated from the carbon monoxide and be partly ionized. This can take place at a temperature of approximately 4400° K. at 0.1 atmospheric pressure. Moreover, ionization need not take place at the point where the chemical reaction is taking place. Rather, the aluminum can be ionized at another point, thereby limiting the amount of space over which plasmas must be handled.

As a result of the foregoing, it is no longer necessary to provide structural walls capable of withstanding unusually high temperatures. Rather, conventional wall structures cooled by conventional heat transfer techniques (e.g., water or eutectic coolants) can be used. At the same time, the process maintains substantially the same or improved throughput rates and has all the advantages of the aforesaid described separation process.

For the purpose of illustrating the invention, there are shown in the drawings forms which are presently preferred; it being understood, however, that this invention is not limited to the precise arrangements and instrumentalities shown.

FIG. 1 shows a sectional view of an apparatus for performing one of the processes in accordance with the present invention.

FIG. 2 is a sectional view of apparatus for performing other processes in accordance with the present invention.

Referring now to FIG. 1 in detail, there is shown an apparatus for reducing ore to a metal and products (or product) of the reaction (such as an oxide), and separating the metal from the reduction products in accordance with the process described herein. The apparatus is designated generally as 10.

The present invention reduces an ore to a metal and products of the oxidation and separates the metal from the products. The principal aspects of the process are creating a chemical reaction with the ore and the reaction products together so as to form the metal and the products in a dissociated gaseous state. The metal may be partly ionized or it may be later heated to a temperature where it is partly ionized. In any case, the gaseous combination of metal and products is at a temperature where only the desired metal is significantly ionized and there is no significant ionization of the products or other remaining components of the gas. Thus, the products may be regarded as being neutral. The entirety of the gas including the plasma is then passed at a high velocity through a magnetic field having both parallel and perpendicular components relative to the direction of flow. While passing through the magnetic field, the metal is separated from the other components of the gas. The metal is taken from the separator while the products and other remaining matter are appropriately processed in by-product and recycling devices.

The apparatus 10 will be described in connection with the reduction of alumina by carbon. It should be understood, however, that such exemplary description is in no way intended to limit the principles described herein since the process may be used to extract other metals from concentrated ores in a more or less pure condition. For example, the ore can be reduced with hydrogen rather than carbon or it may be reduced with another metal. Aluminum is chosen since it is the principal purpose of the present invention to provide a means for readily reducing alumina or other oxides of aluminum.

In accordance with the present invention, a charge consisting of a mixture of carbon and alumina in a granulated state is forced under pressure through the hollow electrode 12, which electrode is preferably made of carbon or its equivalent. Carbon is chosen because it is electrically conductive as well as being capable of withstanding high temperatures. The charge may be mixed with a gas that causes it to flow much like a fluid. The gas may be carbon monoxide which is a by-product of a reaction process and hence will not contaminate the process. Of course, other gases, such as the noble gases, can be used. The carbon in the charge can be from petroleum coke, charcoal, carbon black or graphite.

The charge flows through the hollow electrode 12 and then it is deflected by the deflection plate 14 as indicated by the arrows 15. Electrode 16 is positioned opposite to hollow electrode 12 and both electrodes are connected to a source of electrical power (not shown). An arc 18 is struck between the electrodes 12 and 16 and caused to rotate by reason of the magnetic field generated by the coil 20. The coil 20 may be of a superconductive type (cryogenic) so as to be capable of generating a magnetic field $\vec{B}$ of appropriate strength as hereinafter specifically described. The arc 18 provides sufficient heat to cause the carbon to react with the alumina so that the resultant material flowing down the channel 22 consists of gaseous aluminum and carbon monoxide according to the following:

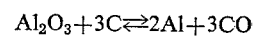
$$Al_2O_3 + 3C \rightleftharpoons 2Al + 3CO$$

Although the arc 18 may partly ionize the aluminum, it is preferable that such ionization be provided by a series of electrodes 24 and 26 located downstream from the mixture of dissociated carbon monoxide and aluminum. Such electrodes 24 and 26 are connected to an appropriate source of electrical power and provide arcs 28 and 30 to the electrode 12. It should be understood that the electrodes 24 and 26 are representative of a series of electrodes spaced around the entire apparatus 10 so that the entirety of the gaseous mixture of aluminum and carbon monoxide passes through a zone of sufficient temperature to partly ionize the aluminum.

It is preferable to ionize the aluminum at the entrance to the channel 22 because a large force would be required to move the mixture of gas and plasma laterally with respect to the magnetic field (that is, at a large angle) and hence get it to flow into the channel 22. Once in the channel 22, the mixture of gas and plasma flows at an angle to the magnetic field B. The metal, in this case aluminum, being partly ionized, is separated from the carbon monoxide and condenses on the collecting wall 32. The liquid aluminum is collected in the trough 34 and flows from the apparatus 10 through the duct 36. The carbon monoxide bypasses the trough 34 and is exhausted from the apparatus 10 through the continuation of the channel 22 connected to an appropriate duct. If desired, the heated carbon monoxide can be recirculated and mixed with the charge within the electrode 12 so as to provide preheating and fluidization.

As shown, the channel 22 is formed by the wall 38 spaced from the collecting wall 32. In the embodiment shown, the wall 38 has a bell shape and is symmetrical about an axis defined by the electrodes 12 and 16. In a like manner, the collecting wall 32 is also symmetrical about the axis defined by the electrodes 12 and 16 and has a bell shape. It should be understood, however, that the configuration of the walls may be varied in accordance with appropriate fluid flow principles.

The walls 32 and 38, as well as the deflector plate 14 and the walls of the trough 34, are provided with appropriate cooling means. They may be, for example, cooled by water flowing through tubes or by an appropriate eutectic such as sodium-potassium.

As used herein, partial ionization of the aluminum is from 0.2% to 10% partial ionization with 2% to 10% being the preferred range. Although percentages of ionization in excess of 10% are obviously possible, such percentages cost more in energy to separate a given weight of metal, such as aluminum. The advantage of a percentage of ionization of approximately 10% is that the size of the apparatus 10 can be reduced. At lower percentages of ionization, the size of the apparatus increases but less energy is required. Optimum size and ionization can be calculated.

Separation is based on the fact that the selected metal element within the reduction products such as aluminum, is partly ionized. Thus, the aluminum ions (Al+) are the major ionic species in the gaseous mixture between 3000° K. and 6000° K. Since the cross section of charge exchange between an atom and an ion of the same element is very large, each metal element has a high probability of being ionized within a short period of time. By applying a magnetic field to the mixture of gas and plasma, the partially ionized flow of the selected specie element (e.g., Al with Al+) is effected by the magnetic field $\vec{B}$.

The channel 22 is annular in configuration so that the flow of gas and plasma is continuous around the axis of the apparatus 10. Importantly, the flow is at an angle $\beta$ with respect to the magnetic field. The angle $\beta$ may vary along the path of flow of the plasma or it may be maintained constant by shaping the magnetic field $\vec{B}$ or by using an uncurved collector wall 32.

By Lenz' law, a conductor resists the change in total magnetic flux which it encompasses. Consequently, the conducting plasma flowing through the channel 22 experiences a force which the non-conducting reduction product gases do not directly experience. This force produces a separation of the plasma and gas.

The term "plasma" as used throughout this specification is intended to mean that portion of an ionized gas or vapor of such extent that within it static charges are statistically screened by charges of opposite sign and of small extent compared to the extent of the gas.

In the channel 22, the hot gases (consisting of aluminum ions, electrons, neutral aluminum atoms and neutral carbon monoxide molecules) flow along the collector wall 32. The gas is moving at a velocity $\vec{v}$ less than the speed of sound and at an angle $\beta$ to the magnetic field $\vec{B}$. As the hot gas and plasma move along the wall, a large current carried primarily by the electrons is produced. The electrons exist by virtue of having boiled off of the aluminum atoms. The electron flow is around the axis of the separator by reason of the fact that they are forced to move at right angles to the magnetic field $\vec{B}$ and to the gas velocity. This motion produces a current density $\vec{J}$ circulating around the axis of the machine. This circulating current, which closes upon itself, in turn interacts with the parallel component of the magnetic field $\vec{B}_{\parallel}$, producing a force on the electrons. The force density $\vec{F}$ is either radially in or radially out depending on the direction of the magnetic field. In the example shown in the drawing, it is radially in toward the wall 32.

As the electrons start to move toward the wall 32, an electric field arises due to the separation between the ions (Al+) and the electrons. This radial field pulls the ions after the electrons toward the cooled wall surface 32 where they condense and flow into the trough 34. The foregoing relationships between the magnetic field $\vec{B}$, the current density $\vec{J}$ and the force density $\vec{F}$ is described in the foregoing relationship:

$$F = \frac{vB_\perp B_\parallel}{\eta}$$

where the terms are defined as described above and $\eta$ is the resistivity of the gas and plasma.

There is a charge exchange between the neutral aluminum atoms and the aluminum ions. An electron may jump from an atom to a nearby aluminum ion thus converting the atom back to an ion which now feels the pull of the electrons moving toward the wall 32. By averaging out this exchange between neutral aluminum atoms and aluminum ions over a given time scale, any given aluminum atom appears to have a positive charge which is less than the electron's charge. Thus, all of the aluminum atoms can be regarded as "partial aluminum ions." The electric field created by the electrons is large enough to pull all of the aluminum toward the wall.

Thus, the resonant charge exchange helps fulfill the completion of the process. Typically, the resonant charge transfer cross section is approximately $10^{-14}$ cm.$^2$. This means that a given atom changes its ionization state approximately $10^7$ times per second for a temperature of 5000° K. and a pressure of the order of one atmosphere. Accordingly, an aluminum atom can only move a few tens of microns before changing its ionization state. This fact means that a very small percentage of ionization is capable of moving a whole volume of aluminum by electric forces.

The equation set forth immediately above describes the force at any one position of the partly ionized gas mixture within the magnetic field $\vec{B}$. Thus, the velocity $\vec{v}$ may vary along the direction of flow of the gas. Indeed, the velocity of the gas will increase as it flows from the entrance of channel 22 toward its exit. Such velocity is preferably less than the speed of sound. It should be understood, however, that the invention is applicable at supersonic velocities providing that cooling and heat exchange problems existing at such velocities are resolved.

The electric force on each ion is nearly inversely proportional to the ionization of the ionized specie such as aluminum. Thus, the total force per unit volume (force per ion times the number of ions per unit volume) set forth in the aforesaid equation is nearly independent of the percentage ionization. This can be decreased only so far, however, before $\eta$ increase too much. The limit is around a few tenths of a percent ionization of the aluminum. Large quantities of energy for full or substantial ionization of the selected species is not required.

FIG. 2 illustrates another embodiment 50 of the invention. This apparatus allows carbon monoxide to escape through the charge and low vapor pressure components to be drawn off as their concentration builds up in a liquid, thus providing partial separation by differential vapor pressures. In addition, it uses a shaped magnetic field to create a magnetic pressure on the annular plasma stream.

A charge 60 comprising carbon and the aluminum containing ore, e.g., bauxite or clay, is led into a reaction chamber 58 through a conduit 52 from another vessel (not shown) where the charge has been purged of air and other gases, e.g., carbon monoxide used to pressurize the charge. An arc 61 is struck between an electrode 56 and the pool of metal 63 through the vapor space 62. The temperature in the space 62 is very high, greater than 10,000° K. The reduction takes place where the charge 60 is heated by the heat in the vapor space 62. Some current flows through the charge and causes further heating. Direct or alternating current may be used and if desired three electrodes may be used with three-phase current.

The reaction produces aluminum, carbon monoxide and other species such as aluminum suboxides as well as other metals and their compounds, if present. Significantly, the gas 65 (primarily CO) escapes through the incoming charge, condensing all gaseous species except carbon monoxide. The liquid melt 63 contains essentially all the metals and perhaps an oxide phase but the great majority of the oxygen will have been converted to carbon monoxide which after passing through the reaction vessel 58 is led out the tube 54.

The walls 64 of the chamber 58 and liquid flow tube 66 can be made largely out of carbon with the understanding that there are supports, cooling channels and outer insulation not shown. It would be advantageous to line the walls 64 with aluminum nitride, silicon carbide or other appropriate refractories resistant to the melt 63 which is present.

The liquid melt 63 flows through the tube 66 into the chamber 68. Here the melt is evaporated generating the gaseous vapors 80. In the apparatus 50, a large number of enclosed carbon resistance heaters 70 are used to heat the liquid melt 63 to evaporation temperatures. The temperature of lower heaters 70a is higher than the temperature of upper heaters 70b to assure that the minimum amount of more volatile aluminum is present near the bottom of the vessel. The remaining liquid, depleted in aluminum, as well as combined and dissolved carbon and oxygen which escape as carbon monoxide, is let out the tube 72 and collected. The proportions of carbon and oxygen are adjusted in the incoming charge 60 so that there is not a significant excess of either in vessel 68. The amount of liquid let out through tube 72 is controlled to maintain the composition in vessel 68 at the desired level.

An arc is struck between the electrodes 74 and 76. The presence of a magnetic B field causes this arc to rotate and fill the space between the electrodes thus ionizing the gas passing between them. All of the electrodes 74 and 76 as well as electrode 56 are provided with adjusting apparatus (not shown) to allow them to be moved in continuously as the end of the electrodes erode away.

The gaseous vapor comprises aluminum, partially ionized (e.g., 2% ionization at 4300° K. and 0.1 atmosphere pressure), plus other species (e.g., carbon monoxide and silicon) at much lower degrees of ionization if any. Indeed, there is no significant ionization of these other species. The walls of the chamber 68 above the evaporator are maintained hot enough so that the vapors do not condense on them. If not so maintained, there will be a large loss in heat due to this condensation. Fortunately, graphite is stable in the presence of aluminum vapor at high temperatures and low pressures. At 0.1 atmosphere pressure and 2400° K. neither condensation nor reaction will occur.

The magnetic field B is created by the coils 78 which may be of superconducting type. The necessary cooling and insulation are included in the coils 78. The coils are spaced to create an inhomogeneous field which compresses the generally annular stream of gas 80 and forces it into the annular space 79 between the coils where it flows out through the channels 82 to be condensed and collected. Only the partly ionized gas, aluminum, is constrained by the magnetic field to follow this path. The un-ionized gas, e.g., carbon monoxide or silicon, diffuses out of the stream and is collected and pumped out through channels 84 and 85.

The basic mechanics of separation in chamber 68 are the same as those described with respect to the embodiment of FIG. 1. However, the manner of flowing the partly ionized specie so that it moves at an angle with respect to the magnetic field is different. In the embodiment of FIG. 1, the flow of the ionized specie is directed by walls. In the embodiment of FIG. 2, the flow of the ionized specie is directed by a shaped magnetic field. In particular, the coils 78 create a magnetic field whose intensity increases in the direction of gas flow. The gaseous flow is relatively undirected, at least in comparison with the directed flow velocity of the invention described in patent application Ser. No. 269,634 or the embodiment of FIG. 1. The plasma, however, having been ionized by the arc extending between electrode 74 and electrode 76, tends to follow the magnetic field lines and is relatively squeezed together as the field intensity increases. This tendency, however, is by no means perfect and the plasma drifts across the magnetic field lines. Accordingly, the plasma is in effect moving at an angle relative to the magnetic field and this effect is enhanced by reason of the increasing field intensity. Such angular movement relative to the magnetic field necessarily generates the requisite force which causes the plasma to move in a defined region of space which in this case is an annulus directed into the space 79. Having confined the plasma to a particular region of space, it is then separated by directing it through the conduits 82. The remaining un-ionized or neutral constituent species of the gas 80 are exhausted through the conduits 84 and 85.

The foregoing separation has certain advantages. In particular, the high temperature plasma is maintained at a position remote from the confining walls. Accordingly, there is no need to provide walls which must withstand the effect of high temperature plasma in excess of 3000° K. This method of separation is described in detail in patent application Ser. No. 365,925, filed June 1, 1973 and copending herewith. It should be understood, however, that separation can be equally effected by using the apparatus illustrated in FIG. 1 wherein the gaseous flow is directed by walls.

The present invention may be embodied in other specific forms without departing from the spirit or essential attributes thereof and, accordingly, reference should be made to the appended claims, rather than to the foregoing specification as indicating the scope of the invention.

We claim:

1. A process for separating a constituent of a compound from the compound, comprising:

chemically reacting the compound with a reducing agent to produce the constituent and a product of the reduction reaction; and separating the constituent from the product of the reaction;

said step of separating the constituent from the product of the reduction reaction including partly ionizing the constituent in a gaseous state;

flowing the partly ionized gaseous constituent together with a gaseous product of the reduction reaction through a magnetic field B at a velocity $v$;

said magnetic field B being configured relative to said gas velocity $v$ such that at least the partly ionized constituent moves at an angle relative to the magnetic field B;

permitting the current J created by the interaction of the moving electrons of the partly ionized constituent with the perpendicular component of the magnetic field $B_\perp$ to flow in a closed path;

using said current J flowing in a closed path to interact with the parallel component $B_\parallel$ of the magnetic field B to generate a separating force acting upon the partly ionized constituent; and collecting the partly ionized constituent apart from the gasous product;

whereby said constituent is removed from said product at containment temperature substantially lower than if said constituent were directly removed from said product using the separation process without first reducing the compound.

2. A process in accordance with claim 1 wherein the compound is an ore of a metal and the constituent is the metal.

3. A process for separating a constituent of a compound from the compound in accordance with claim 1 including generating a gaseous constituent directly from the reduction reaction.

4. A process for separating a constituent of a compound from the compound in accordance with claim 1 including removing at least a portion of the product of the reduction reaction prior to flowing the partly ionized constituent and product through the magnetic field.

5. A process for separating a constituent of a compound from the compound in accordance with claim 1 including reacting the compound with the reducing agent by passing the compound and the reducing agent through an electric arc.

6. A process for separating a constituent of a compound from the compound in accordance with claim 2 wherein the ore is alumina and the constituent metal is aluminum.

7. A process for separating a constituent of a compound from the compound in accordance with claim 1 including the step of reacting alumina with carbon and separating aluminum as the constituent from carbon monoxide as the reaction product.

8. A process for separating a constituent of a compound from the compound in accordance with claim 7 wherein at least a portion of the carbon monoxide reaction product is removed prior to flowing the aluminum and flowing the remainder of the reaction product through the magnetic field.

9. A process for separating a constituent of a compound from the compound in accordance with claim 8 including the steps of flowing the prior removed carbon monoxide reaction product through the incoming charge of alumina and carbon.

10. A process for separating a constituent of a compound from the compound in accordance with claim 1 wherein:

the constituent and a product of the reduction reaction are produced in a liquid state;

preferentially evaporating the constituent from the liquid state; and flowing gaseous vapors of said constituent through said magnetic field.

11. A process for separating a constituent of a compound from the compound in accordance with claim 4 including moving the removed portion of the product of the reduction reaction through an incoming charge of compound and reducing agent.

12. A process for separating a constituent of a compound from the compound in accordance with claim 11 including:

producing the constituent and at least a part of the product of the reduction reaction in a liquid state;

preferentially evaporating the constituent from said liquid; and flowing gaseous vapors of said constituent through said magnetic field.

13. A process for removing a metal from an ore of the metal, comprising:

chemically reacting the ore with a reducing agent to produce the metal and a product of the reduction reaction;

separating the metal from the product of the reaction;

said step of separating the metal from the product of the reaction including partly ionizing the metal in a gaseous state;

flowing the partly ionized metal and the product of the reduction reaction through a magnetic field in a manner so that the magnetic field acts upon the metal to confine it to a region of space apart from the product of the reduction reaction; and collecting the metal apart from the product of the reduction reaction.

14. Apparatus for separating a constituent of a compound from the compound, comprising:

means to chemically react a charge of the compound and a reducing agent to produce the constituent and a product of the reduction agent; and means to separate the constituent from the product of the reduction reaction;

said separating means comprising means to partly ionize the constituent in a gaseous state; and means to flow said partly ionized constituent together with the product of the reduction reaction through a magnetic field, said magnetic field and the flow of said partly ionized constituent being such that the partly ionized constituent is confined to a region of space; and collecting the partly ionized constituent apart from the product of the reaction;

whereby said constituent is removed from said product at a containment temperature substantially lower than if said constituent were directly removed from said product using the separation means without first reducing the compound.

15. Apparatus in accordance with claim 14 wherein the compound is an ore of a metal and the constituent is the metal.

16. Apparatus in accordance with claim 15 wherein the ore is alumina and the constituent is aluminum.

17. Apparatus in accordance with claim 14 including electrode means to heat said compound and reducing agent to effect the reduction reaction.

18. Apparatus in accordance with claim 14 including electrode means to partly ionize the constituent.

19. Apparatus in accordance with claim 14 wherein:

said means to reduce said compound includes means to collect the constituent and product in a liquid state;

means to conduct said liquid to said separation means; and means to selectively evaporate said constituent and a part of said product to flow through said separation means.

References Cited
UNITED STATES PATENTS

| | | | |
|---|---|---|---|
| 3,005,859 | 10/1961 | Candidus | 75—65 |
| 3,607,221 | 9/1971 | Kibby | 75—10 |
| 3,522,425 | 8/1970 | Rich | 55—101 |
| 3,004,158 | 10/1961 | Steimel | 250—298 |
| 3,443,087 | 5/1969 | Robieux | 250—298 |
| 2,763,125 | 9/1956 | Kadosch | 55—101 |

L. DEWAYNE RUTLEDGE, Primary Examiner

P. T. ROSENBERG, Assistant Examiner

U.S. Cl. X.R.

75—65; 55—100; 204—164; 250—298